US006484993B2

(12) United States Patent
Huffman

(10) Patent No.: US 6,484,993 B2
(45) Date of Patent: Nov. 26, 2002

(54) PIVOTAL ARM LIFT FOR TELEVISION DISPLAY

(75) Inventor: Charles E. Huffman, Parker, CO (US)

(73) Assignee: Safety Lock & Lift, Ltd., Panama City, FL (US)

( * ) Notice: Subject to any disclaimer, the term of this patent is extended or adjusted under 35 U.S.C. 154(b) by 41 days.

(21) Appl. No.: 09/736,061

(22) Filed: Dec. 14, 2000

(65) Prior Publication Data

US 2002/0073632 A1 Jun. 20, 2002

(51) Int. Cl.[7] .............................. A47F 7/00; A47B 81/00
(52) U.S. Cl. ........................ 248/323; 248/919; 312/7.2; 312/24; 312/26
(58) Field of Search ..................... 248/320, 323–329, 248/330.1, 331, 332, 333, 334.1, 338, 917, 919–924; 312/247, 248, 7.2, 21–24, 26, 27, 30, 242; 348/837; 353/13

(56) References Cited

U.S. PATENT DOCUMENTS

| | | | |
|---|---|---|---|
| 3,485,544 A | * 12/1969 | Beckerman | 312/245 |
| 4,639,106 A | * 1/1987 | Gradin | 353/13 |
| 5,096,271 A | * 3/1992 | Portman | 244/118.5 |
| 5,259,821 A | * 11/1993 | Bryant | 403/108 |
| 5,261,645 A | 11/1993 | Huffman | 254/267 |
| 5,366,203 A | 11/1994 | Huffman | 254/362 |
| 5,467,106 A | * 11/1995 | Salomon | 345/87 |
| 6,256,078 B1 | * 7/2001 | Ogata | 349/58 |
| 6,354,649 B1 | * 3/2002 | Lee | 185/39 |

FOREIGN PATENT DOCUMENTS

JP          409080986 A   *   3/1997

* cited by examiner

Primary Examiner—Ramon O. Ramirez
Assistant Examiner—Jon Szumny
(74) Attorney, Agent, or Firm—James E. Pittenger

(57) ABSTRACT

A display lifting device which is mounted within a ceiling plenum and is arranged for concealing a support framework, lifting arm and display within the ceiling area. A support arm for the display is pivotally mounted within the framework and is biased in the downward position and supported by a cable mounted on a cable drum drivingly connected to a reversible motor. The support arm comprises at least two telescoping sections with the cable connected to the end of the inner lower most section so that as the cable is extended the arm pivots downward with the telescoping sections extending through gravity to their fullest extent. In this way, the display can extend a considerable distance from the ceiling for viewing by the audience while in the retracted position a very small opening and space within the plenum is required for concealment. Mechanical stops and limit switches are provided at both extremes of the movement of the display and support arm to restrict the angular movement of the arm. A cover matching the opening in the ceiling is attached to the support arm and is pivoted from the ceiling to close the ceiling opening when the arm is raised into the upper concealed position. Actuation of the display lifting device can be made with a wired control panel or a remote control device.

30 Claims, 10 Drawing Sheets

PIVOTAL ARM LIFT FOR TELEVISION DISPLAY

FIELD OF THE INVENTION

This invention is directed to a concealed ceiling mount for a large screen display. It is more specifically directed to a pivotal mount for storing within a ceiling a large screen display which can be pivotally and telescopically extended to an exposed position for use.

BACKGROUND OF THE INVENTION

In the design and construction of auditoriums or theaters, it is very desirable to conceal the components of the audio/visual equipment that is to be used in those locations. One of the ways of doing this is to position the equipment in the ceiling or sidewalls with a panel covering the equipment to prevent it from being seen. Upon use, the panel is then either removed or moved aside so that the equipment can perform its function.

In other situations, the equipment has been concealed within the ceiling and provides the capability of lowering the equipment from the ceiling to a use position, whereby a video projector or film projector can be used to show videos or motion pictures on an auxiliary screen positioned at the front portion of the auditorium or theater. Some of these systems include a cable lift or a telescoping column that allows the equipment to be lowered from the concealed position within the ceiling structure.

In recent years, video screens and computer monitors have been redesigned in a relatively flat configuration with large size dimensions. Some of these screens utilize fibre optics to provide the displayed picture, while others use projection of a video image through mirrors and lenses to provide a large scale image. In recent years plasma screen technology has been developed which can provide a flat screen televison display of large proportions. These screens can be as big as 3'x6' or larger, depending upon the application that is intended. It has been found highly desirable to conceal this screen out of sight when it is not being used. At the time that it is needed, it can be exposed or moved into position for use.

The present inventor is a pioneer in the effort to solve these problems by concealing the display unit in a ceiling or wall when it is not being used. As part of that effort, the inventor has devised lift structures, which can be attached in the ceiling area and which can allow a video or movie projector to be remotely raised or lowered from the ceiling surface by a cable lift. In addition, the projector can be lowered to a position which is easily accessible from the floor of the area for maintenance or replacement purposes.

One of the major problems with concealing a mechanism of this type in a ceiling area is the fact that there is usually a very small dimensional clearance available in the plenum area between the ceiling of the auditorium, theater or presentation room and the above floor or roof structure. In many cases, this clearance is no more than 15"–18" and, in many cases, this limited clearance prevents any type of lifting mechanism from being mounted or concealed within the ceiling area. The present patent application is directed to a new invention to eliminate the problems which have been encountered in the past with this type of mechanism and to provide a unique high strength, lifting mechanism which is compatible with a flat screen type of display panel.

INFORMATION DISCLOSURE STATEMENT

This statement is provided in order to comply with the inventor's acknowledged duty to inform the Patent and Trademark Office of any pertinent information of which he is aware that would be of any value or have importance in the Examination of this application. The following patents are known to the applicant and may have some applicability to the present invention and the examination of this application.

The Huffman patents (U.S. Pat. Nos. 5,261,645 and 5,366,203) disclose a remote control, ceiling mounted lifting device which is provided for concealing, supporting and allowing convenient access to audio/visual equipment, such as video/data projectors. The lifting device has an outer mounting framework. A support carriage is arranged within the framework and is suspended by cables and its lateral movement is restricted by a scissor-like stabilizer mechanism. The cables are mounted on a motor driven drum assembly which is laterally positioned within the support framework. An emergency lever brake assembly is provided in conjunction with the cable drum to prevent the carriage from dropping out of control in an emergency situation.

SUMMARY OF THE INVENTION

The present invention provides a lifting mechanism for supporting and moving relatively large flat panel displays. It is primarily intended for concealment of the display within the ceiling area when not in use. Since there is a relatively low structural clearance in the plenum area above the ceiling surface found in most auditoriums, theaters or presentation rooms, the present mechanism has an extremely flat profile which allows it to be installed within the ceiling structure for the purpose of this concealment.

The lifting mechanism, according to the present invention, uses a number of new and novel elements to provide a lifting device having long extensions for relatively large flat objects. Although the object in the present invention is intended to be a type of display such as, a flat screen T.V. or monitor, it can also cover a number of other objects, such as a projection screen for movies or for a video/data projector. In some cases, the video projector utilizing the concealed flat screen can also be supported in the ceiling structure or in a side wall.

The present invention incorporates a relatively compact flat framework mounted within the ceiling cavity with a pivotally extended support arm having a flat screen T.V. mounted at the end of the arm. In the raised or upper position the screen and arm is positioned within the ceiling cavity. A ceiling cap or cover which matches the required ceiling opening is mounted on the underside of the arm and can be aligned to be flush with the existing ceiling surface when the lift is in the raised position. To lower the arm and the attached screen to the lower view position, a wired control switch or a suitable type of remote control device using infrared or UHF can be utilized. Upon command, the arm is pivoted downward to a substantially perpendicular viewing position. As part of the present invention the actual angular position of the screen can be adjusted minutely to position the screen in the correct and proper angular position for viewing by the audience. Thus, the arm can move either less or greater than the 90° vertical position to obtain the desired angular position.

The support arm is pivotally mounted on a shallow, rigid framework which is adequately positioned and mounted within the ceiling cavity or plenum. The pivotal support arm is biased by a suitable device, such as a helical spring attached to the supporting shaft or one or more coiled springs attached to an extension of the arm which can be leveraged beyond the pivot mounting of the arm. This force biases the arm and display in the downward direction and position. A cable wound on a laterally positioned cable drum assembly mounted within the framework has its free end threaded over a pulley and down through the support arm. The end of the cable is secured to the end of the arm. A reversible drive motor properly geared or drivingly connected to the cable drum assembly is provided for extending or retracting the cable as required.

A suitable safety lock can be provided in conjunction with the drum or cable to arrest the rapid downward movement of the cable and arm in an emergency situation. The cable lock can be a lever type lock mounted in conjunction with the cable drum. The lock can be controlled by an over-speed governor attached to the drum to sense the rotational velocity of the drum. At an exceedingly high rate of rotational speed the drum lock can be activated to arrest and stop the rotation of the drum and, thus, the cable and arm. By the same token, a cable brake, such as an automatic clamp can be positioned adjacent to or surrounding the cable so that the cable itself can be clamped and stopped if its velocity exceeds a predetermined rate. It is to be understood that any type of suitable brake which will arrest the downward movement of the arm in an emergency situation can be used.

It is intended that stops will be placed in proper position to restrict the overall movement of the support arm in the up or down position. The up position stop limits the movement of the arm in the retracted ceiling concealed position. The stop for the lowered position restricts the pivotal movement of the arm past a limited arc beyond vertical to control the overall movement of the support arm.

In order to make the lift device as compact as possible, the support arm is arranged in a telescoping configuration wherein the arm is made up of two or more telescoping sections or channels which have an essentially hollow rectangular cross-section. The lower or inner sections of the arm can slidably fit within the dimensions of the upper or base section of the arm. Although the sections of the arm can be mechanically biased into the extended position, it has been found that gravity is suitable for this purpose, with the end of the support cable secured within the inner portion of the end section. Thus, the arm can be lowered by releasing and extending the cable which is guided across a pulley mounted on the side of the arm and down into the interior of the end section. In this way, the lower end section is held in the contracted position within the upper section until the support arm is fully extended with further extension of the cable allowing the end section or sections to lower into a downward extended position with the screen or display object. In the reverse, the cable, upon retracting, first raises the lower or end section of the arm and the attached display into a contracted position within the upper section and then further pivots the arm upward into the concealed raised position within the ceiling. In this way, a relatively long yet compact, heavy duty lifting device is provided for storing and concealing the entire lifting mechanism and display within the ceiling cavity. A ceiling cover can be pivotally mounted from the ceiling and arranged to move with the downward movement of the pivoting support arm or it can be mounted directly on the arm, whereby the entire cover moves with the arm. The attachment for supporting the cover is arranged to move with the arm extension. As can be seen in the present invention, the length of the support arm and the positioning of the screen can be greatly extended to compensate for the height of the ceiling in the auditorium, theater or presentation room and the positioning of the audience within the room.

One of the objects of the present invention is to provide a heavy duty lifting device that can extend a flat screen television or monitor, or the like, from a concealed position within the ceiling of a structure to a lower viewable position which is properly positioned and aligned with respect to the audience.

It is a further object of this invention to provide a lifting device for a flat screen T.V. wherein the position of the screen can be angularly adjusted.

It is a still further object of the present invention to provide a display lift whereby the display can be extended to a position close to the level of the audience and then retracted to a compact configuration before being concealed within the structure.

Other objects and features of this invention will be seen and explained through the following drawings and descriptions.

DETAILED DESCRIPTION OF THE INVENTION

Figure 2:
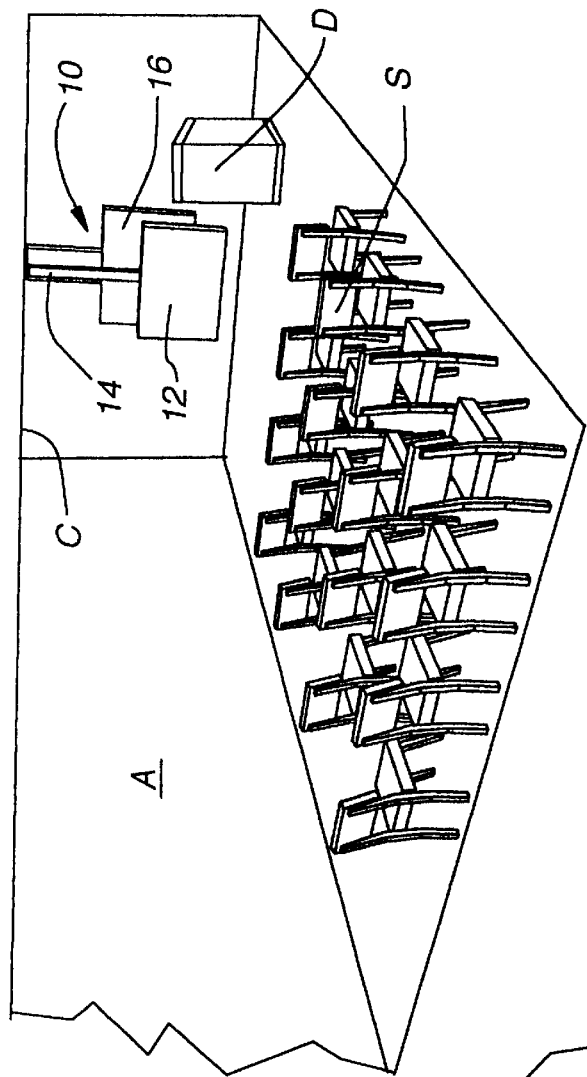
FIG. 2 is a perspective view showing the auditorium of FIG. 1 with the screen extended to a lowered viewing position.
Figure 1:
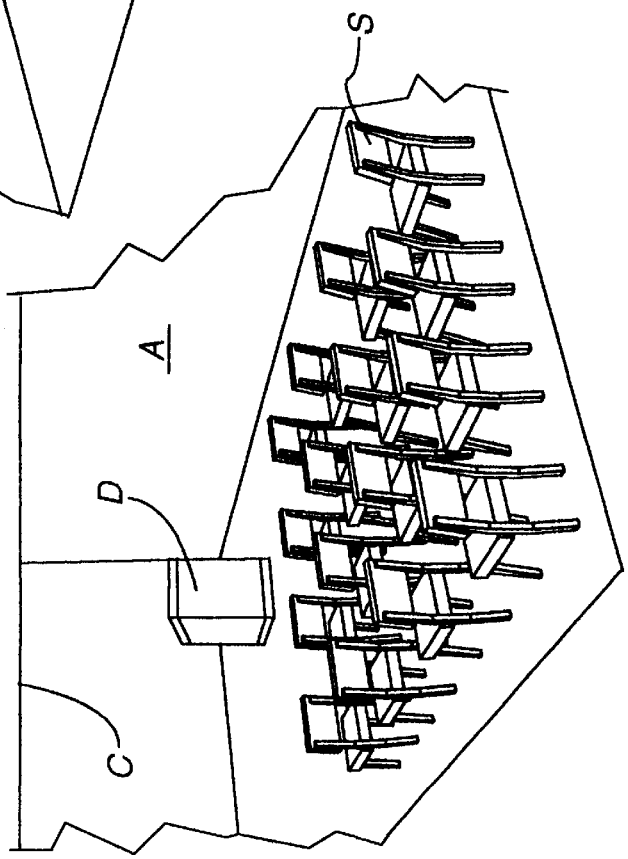
FIG. 1 is a perspective view showing a video display screen concealed within a ceiling structure of an auditorium or presentation area.

Turning now more specifically to the drawings, FIGS. 1 and 2 show a perspective view of an open auditorium versus the same auditorium with the flat video screen and the support lift extended into the lowered viewing position. The auditorium or presentation room A, includes a plurality of seats S and speaker's podium D. This shows the contrast between the open cleared auditorium or presentation room A as shown in FIG. 1 and the appearance of the audio visual device, such as a flat screen TV 12 mounted on a support arm 14 which is part of the pivotal screen lifting device 10 which is the present invention. The lifting device 10 is arranged to be concealed within the ceiling C structure where it cannot be seen and blends into the existing ceiling surface when not in use. Anytime that the display 12 is to be used, the lifting device 10 is then pivoted, usually by remote control, so that the support arm 14 pivots downward out of the ceiling along with the screen 12 and the concealment cover 16. In this way, the display lift can be extended and used as needed.

FIGS. 3–6 show the operation of the ceiling display lift 10. There is a cavity or plenum found immediately above the ceiling of most commercial buildings. This same plenum usually exists throughout the building and most especially, is found in the ceiling areas of auditoriums, conference rooms and presentation rooms. The problem with the plenum found in most commercial buildings is that it is very shallow, usually not being more than 15"–18" in depth. These are the usual dimensions whether it is a false ceiling, such as a suspended acoustical tile ceiling or a structural ceiling having a solid gypsum board surface. The upper part of the plenum is the roof structure or the floor structure for the next story.

In the present invention, a support framework 20 is rigidly and securely mounted within the plenum P of the ceiling structure of the auditorium, theater, conference room or presentation room. Usually the display lift of the present invention is mounted in the forward or front portion of the presentation area so that it can be viewed by the entire audience. The framework 20 is securely mounted and supported within the ceiling structure by any suitable means which is well known in the art.

Figure 3:
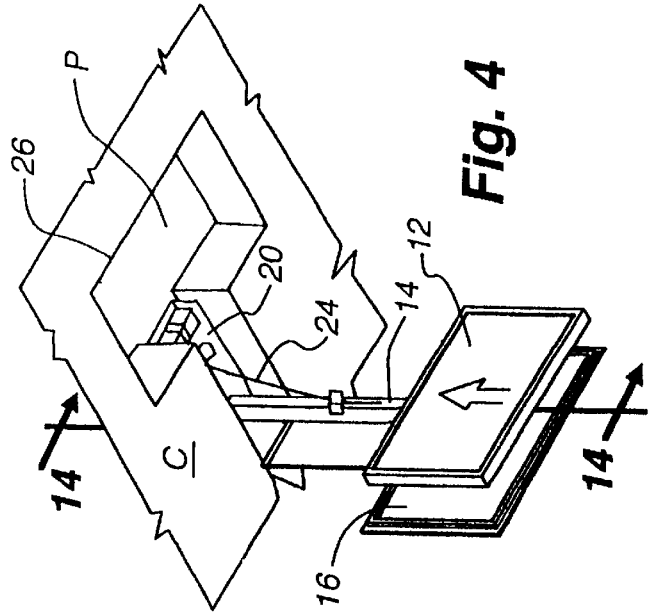
FIG. 3 is an enlarged perspective view showing the display screen and supporting arm in the lowered extended position.

FIG. 3 shows the ceiling display lift according to the present invention in the extended exposed position. The ceiling plenum is exposed with the lift support structure 20 visible in the plenum area. The support arm 14 has the display 12 attached to its lower end. The ceiling concealment cover 16 can be hinged at one end 22 to the ceiling structure C with the opposite end moveably attached to the support arm 14. In this way, the cover 16 is held essentially parallel to the arm 14 when in the extended or the retracted position.

Figure 4:
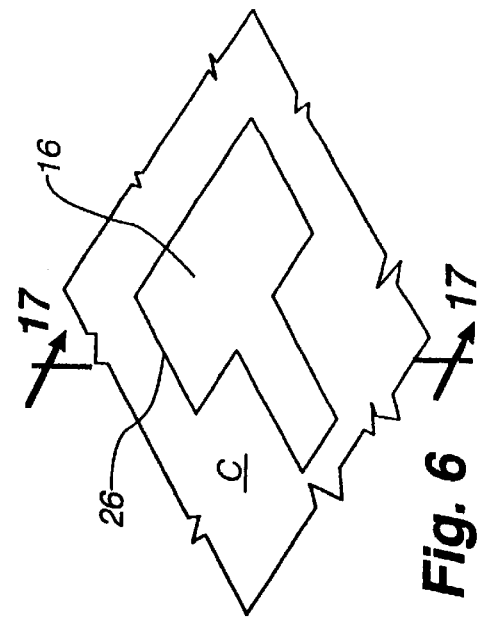
FIG. 4 is an enlarged perspective view showing the display screen being raised in relation to the support arm.
Figure 5:
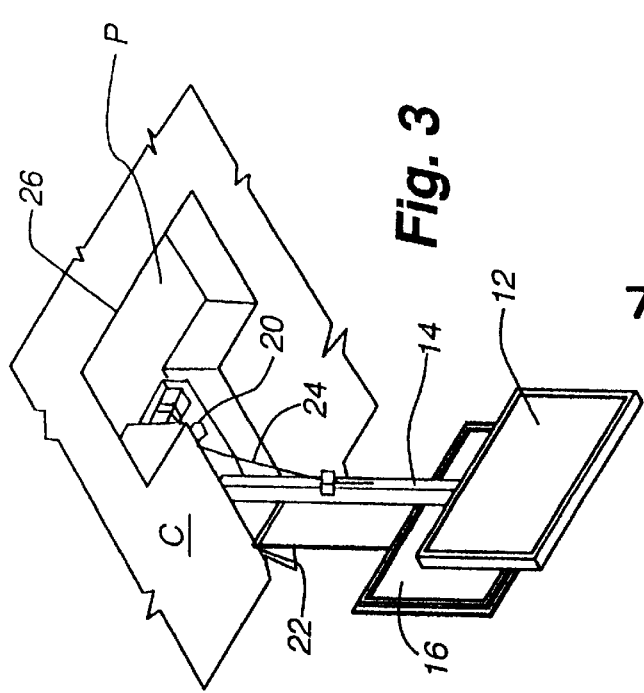
FIG. 5 is an enlarged perspective view showing the display screen and support arm being pivoted into the raised position.
Figure 6:
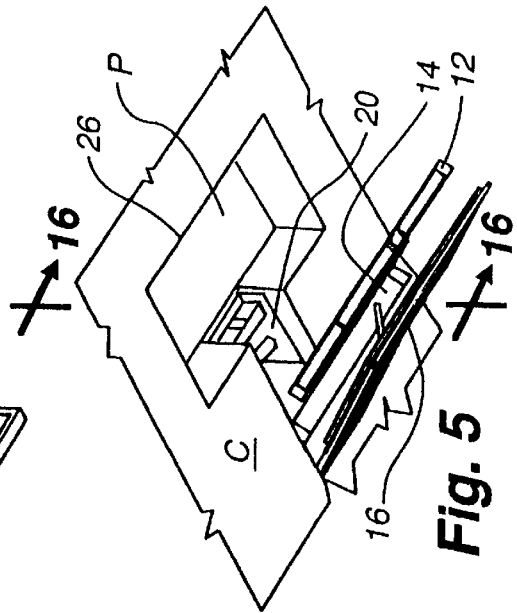
FIG. 6 is an enlarged perspective view showing the display screen and support arm in the raised ceiling concealed position.

FIG. 4 shows the display screen 12 and support arm 14 being raised into alignment with the ceiling cover 16 as a first step in the storing of the ceiling display lift 10. Once the display 12 has reached its contracted position with respect to the support arm 14, the raising mechanism which includes cable 24 starts to pivotally raise the combination of the display 12, support arm 14, and cover 16. This movement is shown in FIG. 5 where the support arm 14, display 12 and cover 16 is partially raised or pivoted towards the ceiling C and plenum P. Once these components have been raised completely into the retracted or concealed position, the cover 16, as shown in FIG. 6, fits the outline of the opening 26 which is present within the ceiling surface C. Thus, the display, supporting arm and support framework are completely concealed within the plenum P of the ceiling C; leaving a flush, unobstructed surface at the ceiling C.

Figure 7:
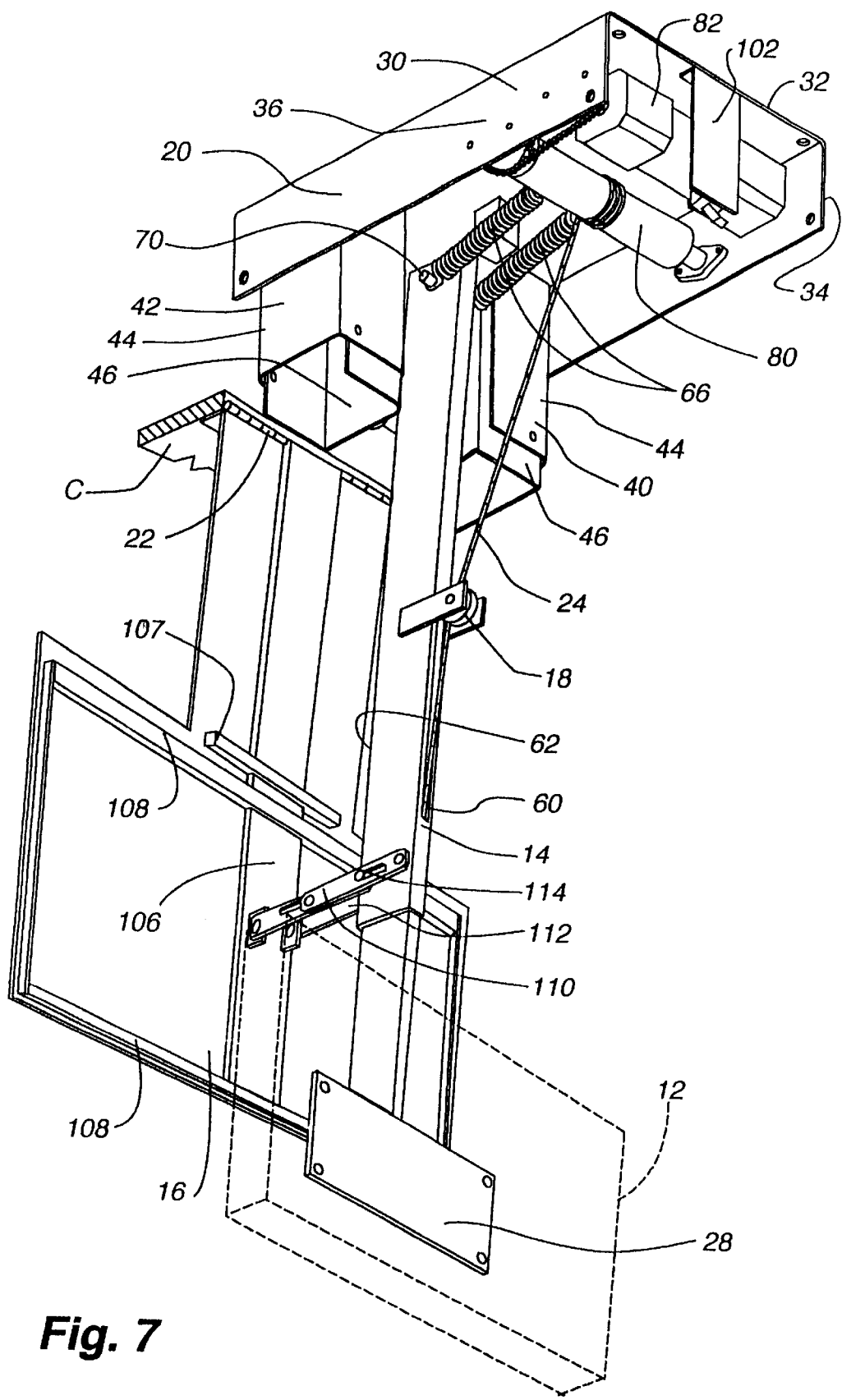
FIG. 7 is an enlarged perspective view showing the support framework and cable mechanism for the pivotable support arm according to the present invention.
Figure 8:
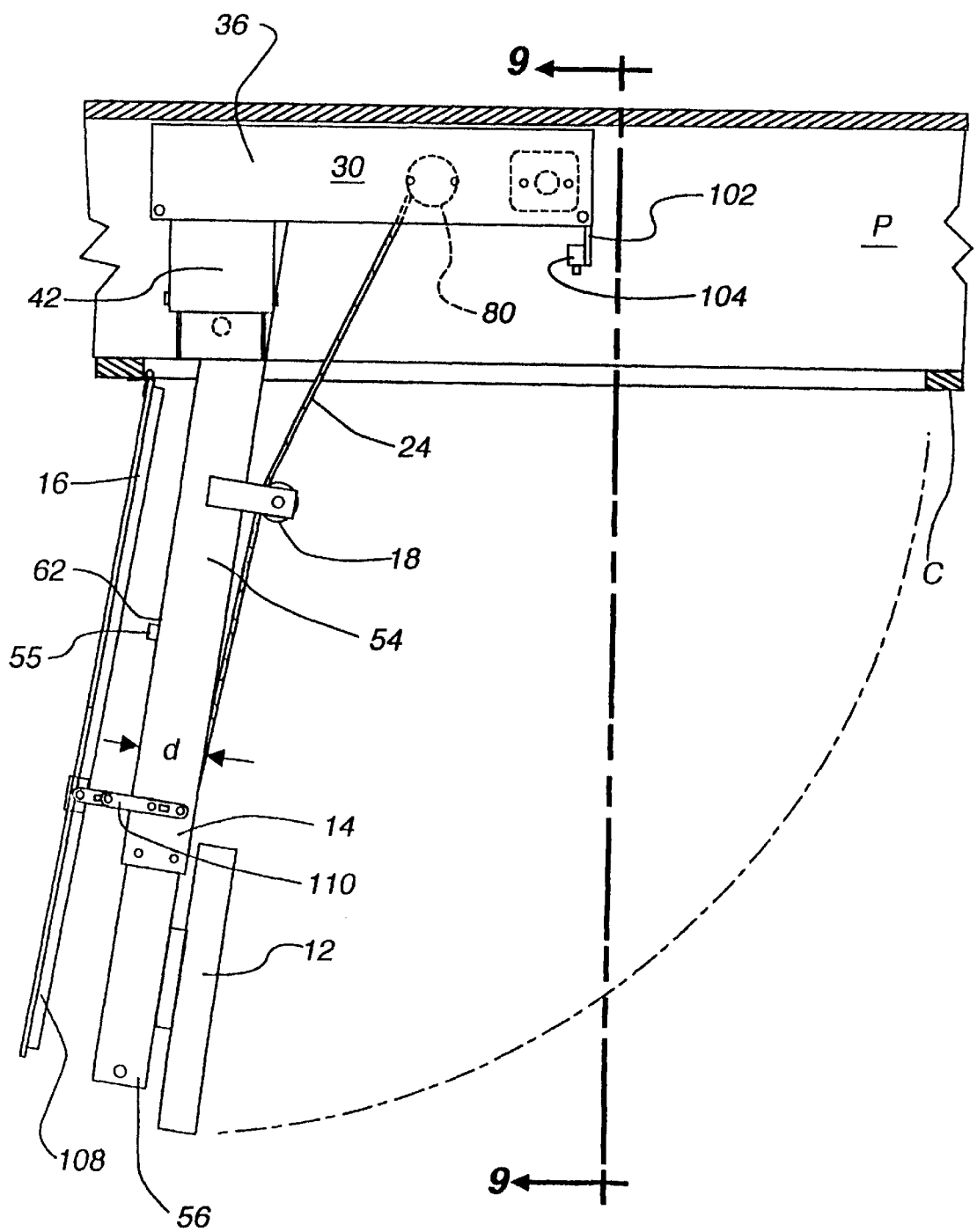
FIG. 8 is a side sectional view showing the screen and support arm in the lowered extended position.
Figure 9:
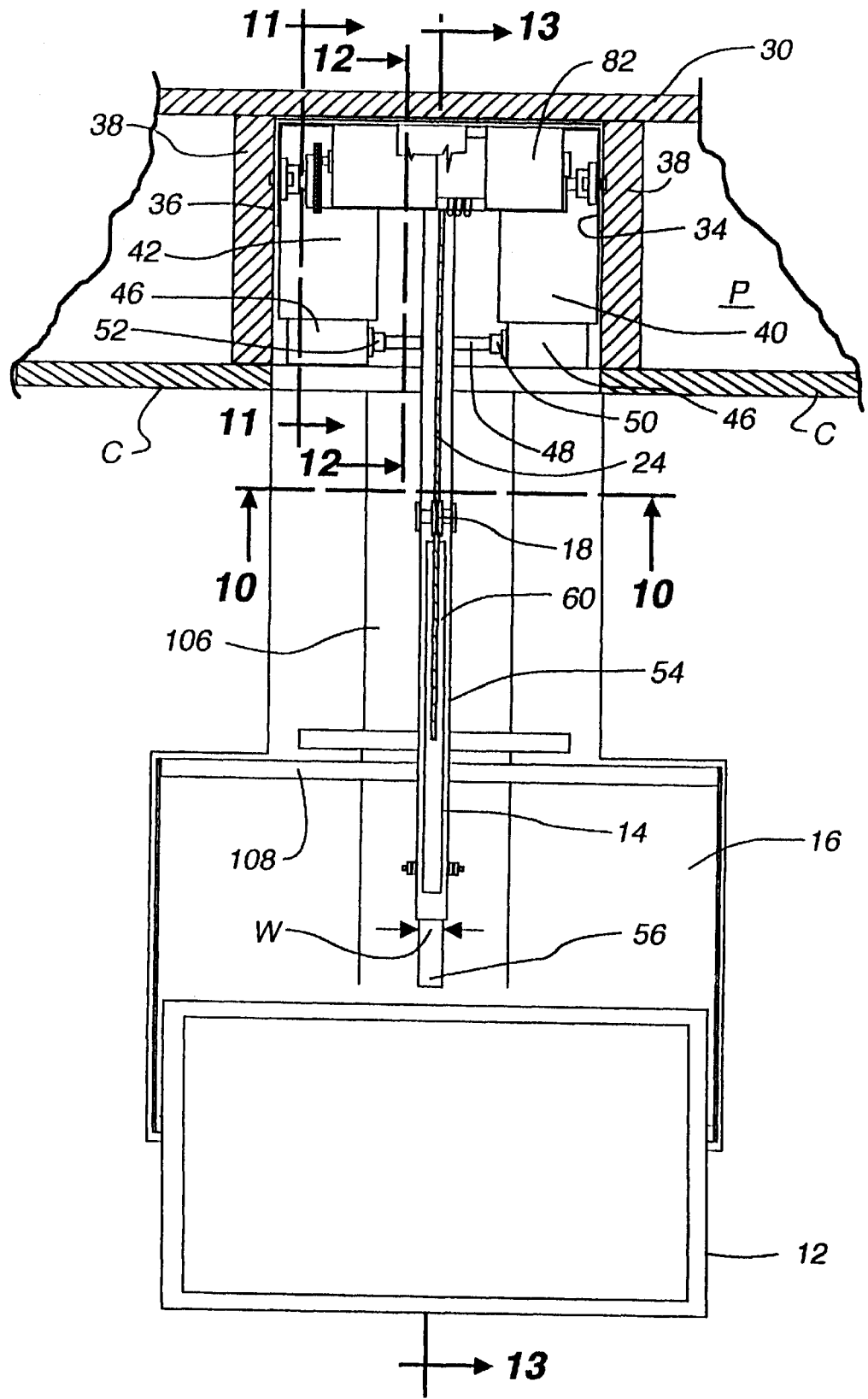
FIG. 9 is a partial cross-section view taken along lines 9—9 of FIG. 8.
Figure 10:
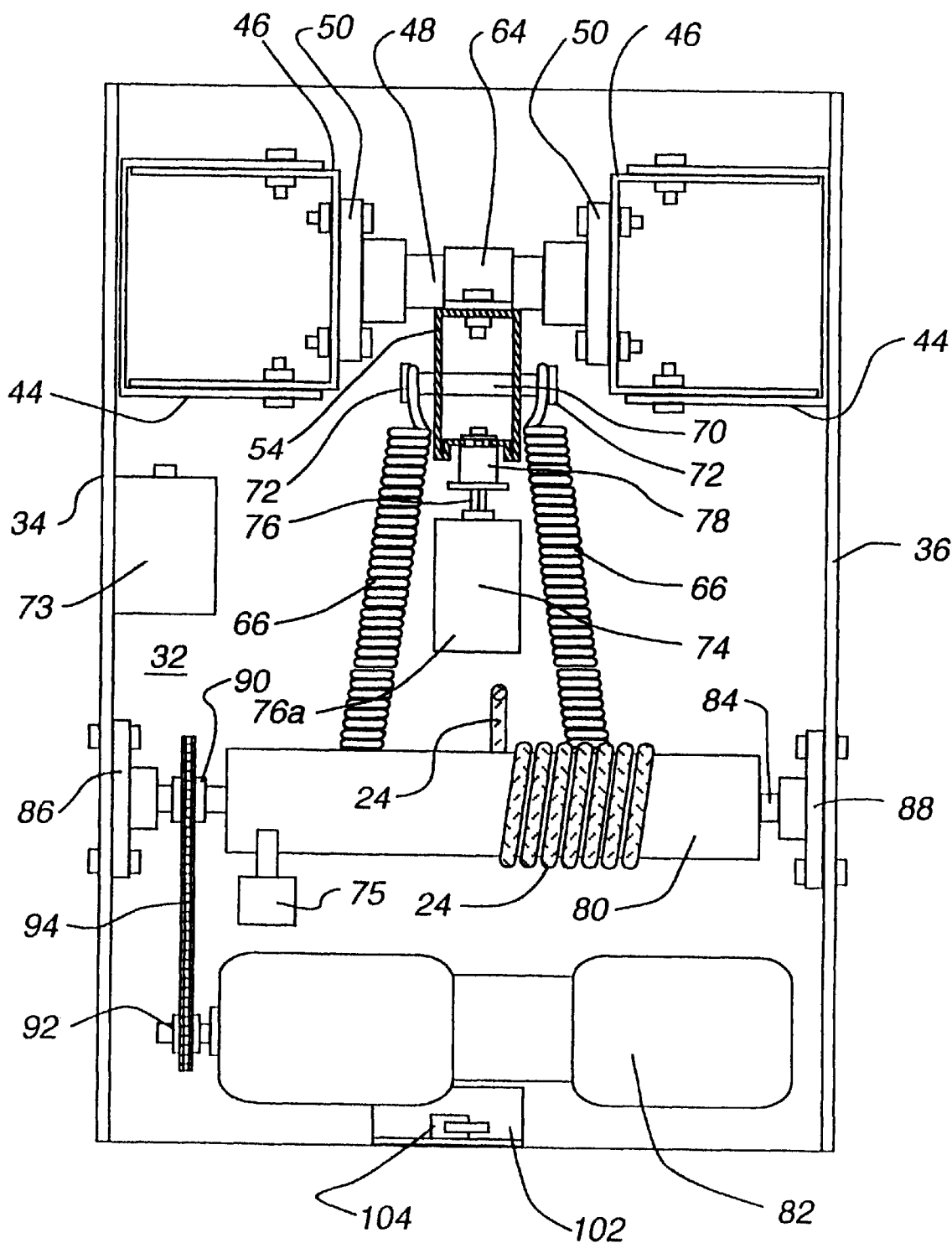
FIG. 10 is a bottom plan view of the support and pivoting mechanism for the display screen lift.
Figure 11:
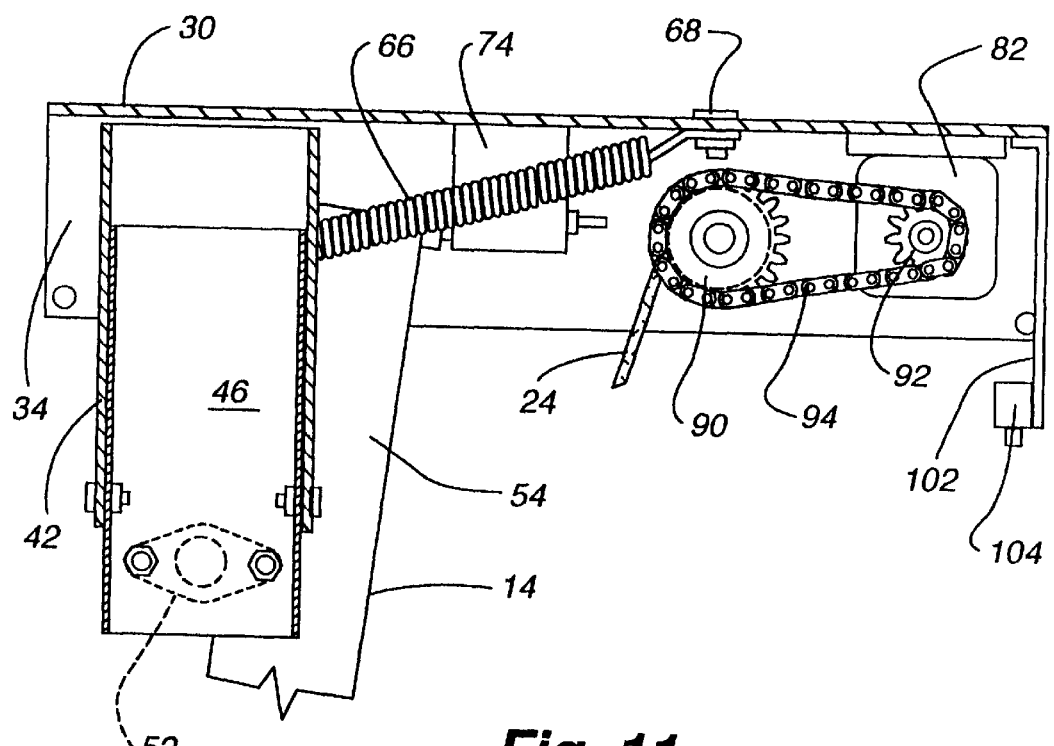
FIG. 11 is a partial cross-sectional view taken along lines 11—11 of FIG. 9.
Figure 12:
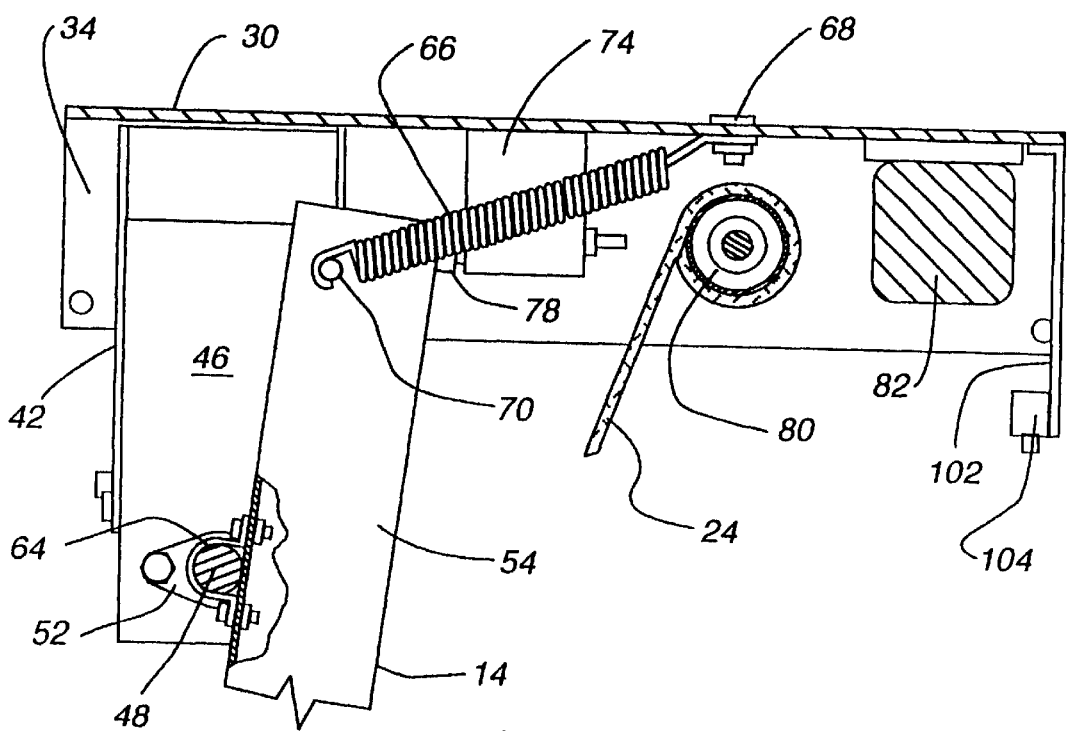
FIG. 12 is a partial cross-sectional view taken along lines 12—12 of FIG. 9.

FIGS. 7–9 show a closeup of the display lifting device 10 including the base 20, support arm 14, ceiling cover portion 16 and display device 12 attached to the end of the support arm 14. The display device 12 is shown as a dotted line, since it is not part of the actual invention, but is supported and displayed by the lifting device 10. A mounting plate 28 is securely attached to the end of the support arm 14 for mounting and supporting the display 12.

The support frame or framework 20 includes an inverted U-shaped support pan 30 having a base plate 32 with substantially perpendicular downwardly extending legs or sides 34, 36. The downward dimension of legs 34, 36 are considerably less than the width of the base plate 32. Suitable mounting holes can be provided within the legs and/or base plate for the mounting of the support pan 30 securely within the ceiling structure 38. The support legs 34, 36 can extend perpendicular to the base plate 32 and are arranged substantially parallel to each other.

A pair of support stanchions are provided adjacent to each of the downwardly extending legs 34, 36. Each stanchion can be fabricated from a short length of a hollow box girder, or it can be formed as illustrated by nesting two U-shaped panels 44, 46 to form an enclosed column or girder. As shown in FIG. 7, the outer panels can be attached to the downwardly extending legs 34, 36, respectively, and can be secured to the legs by any suitable means, such as bolts or by welding. The inner complementing panel is nested within the outer panel and can be adjustably positioned with respect to the outer panel. In other words, the inner panels 46 can be moved inwardly or outwardly with respect to the opposite panel and also can be adjusted in the vertical direction as needed.

The two panels 44, 46 can then be securely attached by any suitable fastening device, such as bolts.

The display support arm 14 can be pivotally mounted, as desired, between the two stanchions 40, 42. A rotatable shaft or bar 48 mounted between two bearing supports 50, 52 attached respectively to the inner mounting plates 46 is suitably arranged for mounting the support arm 14. The bearing supports 50, 52 are permanently attached to the inner surfaces of the inner plates 46 forming part of the stanchions 40, 42. The shaft 48, in most cases, will be arranged parallel to the outer ends of the support pan 30.

The support arm 14 can be fabricated from a plurality of elongated channels. For the sake of illustration, the present drawings will show an arrangement which incorporates two individual channels 54, 56 making up the support arm 14. The channels are formed, usually from hollow box type structures with the upper channel 54 having larger inner dimensions than the outer dimensions of the lower channel 56 and arranged so that the inner channel 56 slides freely within the upper outer channel 54. In this way, the two channels are arranged in a telescoping configuration. It has been found that a much more stable and stronger supporting arm 14 can be provided if the depth d dimension of the channels have a ratio of approximately 2:1 with respect to the width W of the channels. In this way, additional rigidity will be provided in the lifting arm to provide adequate support strength for the raising and lowering of the display 12. As stated above, the supporting arm 14 can be made up of any number of individual channels which are arranged in a telescoping configuration. The number of channels and the length and cross-sectional thickness of the channels is designed to accommodate various ceiling heights and the anticipated weight of the display. A long thin slot 60 can be provided along the outer side of the channels 54, 56. The purpose of this slot will be explained below.

The support arm 14 is pivotally mounted on the shaft 48 by a U-shaped flanged clamp 64 securely attached to the backside 62 of the upper elongated channel 54. The clamp is attached to the channel 54 by means of bolts or other suitable fastening devices. The clamp position is spaced downwardly from the end of the channel 54 a predetermined amount to provide a lever arm for the movement of the support arm 14. This arrangement will be explained later.

A pair of coiled springs 66 can be used to bias the support arm 14 in the downward pivoted position. The springs 66 are anchored at one end by bolts 68 attached to the base plate 32 of support pan 30. The other end of the springs are connected to an anchor bar 70 mounted at the end of the upper channel 54 of the support arm 14. Flanges 72 can be provided on the ends of the anchor bar 70 in order to retain the ends of the springs and prevent them from becoming displaced. The length of the springs 66 and their strength is predetermined for the force that is necessary to bias the support arm 14 in the downward pivoting position. These springs hold the support arm 14 rigidly in the downward most position when the arm is extended. It is also understood that any other type of biasing device can be used, which would bias the support arm in the lowered or downward position.

A stop bracket 74 is arranged on the base plate 32 of the support pan 30. The stop bracket 74 is aligned in the pivotal plane of the support arm 14. A threaded stop bolt having an enlarged flat head and a locking nut is threadedly positioned in the side of the stop bracket 74. A resilient pad 78 can be suitably fastened to the front face of the upper end of the upper channel 54 of the support arm 14 and positionally aligned with the stop bolt 76 for restricting the maximum movement of the downward positioning of the channel 54 and, in turn, the support arm 14. The stop bolt 76 can be threadedly adjusted to establish the maximum lowered position of the support arm 14.

An electrically controlled linear actuator 76a can be substituted for the stop bolt 76. In the lowered position, the support arm 14 is still under slight tension force from the springs 66, movement of the linear actuator away from the arm or towards the arm will cause the arm to angularly move in order to provide a final adjustment to the actual position of the display with respect to the audience.

The movement of the support arm 14 is controlled by a cable drum 80 and reversible drive motor 82. The cable drum 80 is mounted on shaft 84 which is supported between the legs 34, 36 by bearing supports 86, 88. The drive motor 82 and cable drum 80 are drivingly connected by sprockets 90, 92 and an interconnecting drive chain 94. Although this description has been illustrated with a sprocket and chain drive arrangement, any other type of direct gear drive or other suitable drive can be substituted.

Cable 24 is wound around the drum 80. The cable 24 can be braided steel rope having a 3/16 or 1/4 inch diameter which has been found to be suitable for this purpose. The size of the cable is determined by the strength and load requirements that are placed upon the cable by the lifting arm 14 and display 12. The longitudinal placement of the cable drum with respect to the support pan 30 is determined by the position of the downward feeding cable with respect to the support arm 14. A pulley 18 is mounted longitudinally along the upper channel 54 of the support arm 14. In the present structure, the pulley 18 is mounted with brackets provided on both sides of the upper channel 54 in order to provide a closed area for guiding the cable 24. The pulley 18 is mounted at the upper end of the elongated slot 60. The cable is fed from the cable drum 80 across the inner surface of the pulley 18 and down through the slotted channel 60 to an attachment point at or near the end of the lower channel 56 of the support arm 14. The anchor for the cable 24 can be a threaded bolt 96 extending through the sides of the lower channel 56. The head and nut of the anchor bolt 96 located on the outer sides respectively of the lower channel 56 provide a stop when they engage the lower end 98 of the upper channel 54 when the lower channel 56 is raised.

An electrical control box 73 for connecting the input power to the motor 82 is provided within the support pan 30. Suitable wiring is provided throughout the lift for performing the intended functions. A control panel for controlling the extension and retraction of the support arm 14 can be wired directly from the control box 73 to a convenient location for the control panel (not shown). This panel can be located at any location within the auditorium or a control room for the auditorium. It is also to be understood that, instead of using a wired control panel, a wireless arrangement can be provided which could include a portable remote control that could be used to control the movement of the display lift from within or near the auditorium or presentation area.

A bracket 102 mounted at the outer end of the support pan 30 and positioned in the pivotal plane of the support arm 14 can be provided. The length of the bracket 102 is predetermined to provide a stop for the upward movement of the upper channel 54 and the support arm 14. A limit switch 104 is provided in conjunction with the end of the bracket 102 which will automatically disengage the motor 82. The bracket 102 provides the upper stop for the pivotal movement of the arm 14 while the stop 74, 76 limits the pivotal movement of the arm 14 in the downward position.

An electrical limit switch 55, such as a Microswitch, is mounted on the outward side of upper channel 54. An aperture provided through the channel 54 allows the contact pin for the switch to contact the channel 56 and a plastic glide 57 which is adjustably positioned in the upper end of lower channel 56. When the support arm 14 is raised the lower channel 56 is telescoped within channel 54 causing the limit switch 55 to make electrical contact to permit operation of the cable motor 82. As the lift arm 14 is lowered and channel 56 slides downward with respect to upper channel 54 the glide 57 passes the limit switch 55 shutting off the motor 82. The positioning of the glide 57 determines the extended length of lift arm 14 which is usually seven feet.

A suitable arresting brake or locking mechanism 75 can be included in conjunction with the cable drum 80 to arrest the rotational movement of the drum if an emergency situation should occur. This type of emergency could be caused by the chain 94 breaking or the motor 92 malfunctioning. A lever type locking mechanism, as shown and described in U.S. Pat. No. 5,261,645, would be satisfactory for this purpose. It is also understood that a cable clamp mechanism (not shown) could also be used in conjunction with the cable 24 to arrest the cable movement and provide a safety feature for the lift.

Since the cable 24 is the only component that is holding the support arm 14 in the upper position, it is possible to provide a mechanical locking device, such as a pin operated solenoid suitably mounted on the framework support pan 30. In this way, a solenoid actuated pin can engage an aperture in the side of the lifting arm 14 which can physically lock it when it is in the upper or retracted position. In this way, the arm cannot extend without applying an electrical signal to the solenoid to retract the pin before the lift arm is to be lowered.

The ceiling cover 16 can include reinforcing strips 106, 108 which can be used to reinforce and improve the lateral rigidity of the cover 16. A pair of attachment brackets 110, 112 are pivotally connected at one end to the cover 16 and at the other end to the upper channel 54 of the support arm 14. The brackets 110, 112 are pivotally attached at each end to accommodate the differences between the radial movement of the lift support arm 14 and the cover 16. Elongated slots 114 can be provided in each of the brackets 110, 112 with adjusting screws provided for adjustment of the space between the arm 14 and cover 16 when in the raised or concealed position. During the movement of the arm 14 the brackets 110, 112 will pivot backward with respect to the cover 16 in order to accommodate the pivotal movement of the cover and raise it into the closed position in the ceiling C.

OPERATION

It is to be understood that, for the sake of illustration, the operation of the display lifting device will be described from the extended or lowered position to the upper concealed position. The movement of the support arm and display to the lowered position would be the reverse of the following description.

Figure 13:
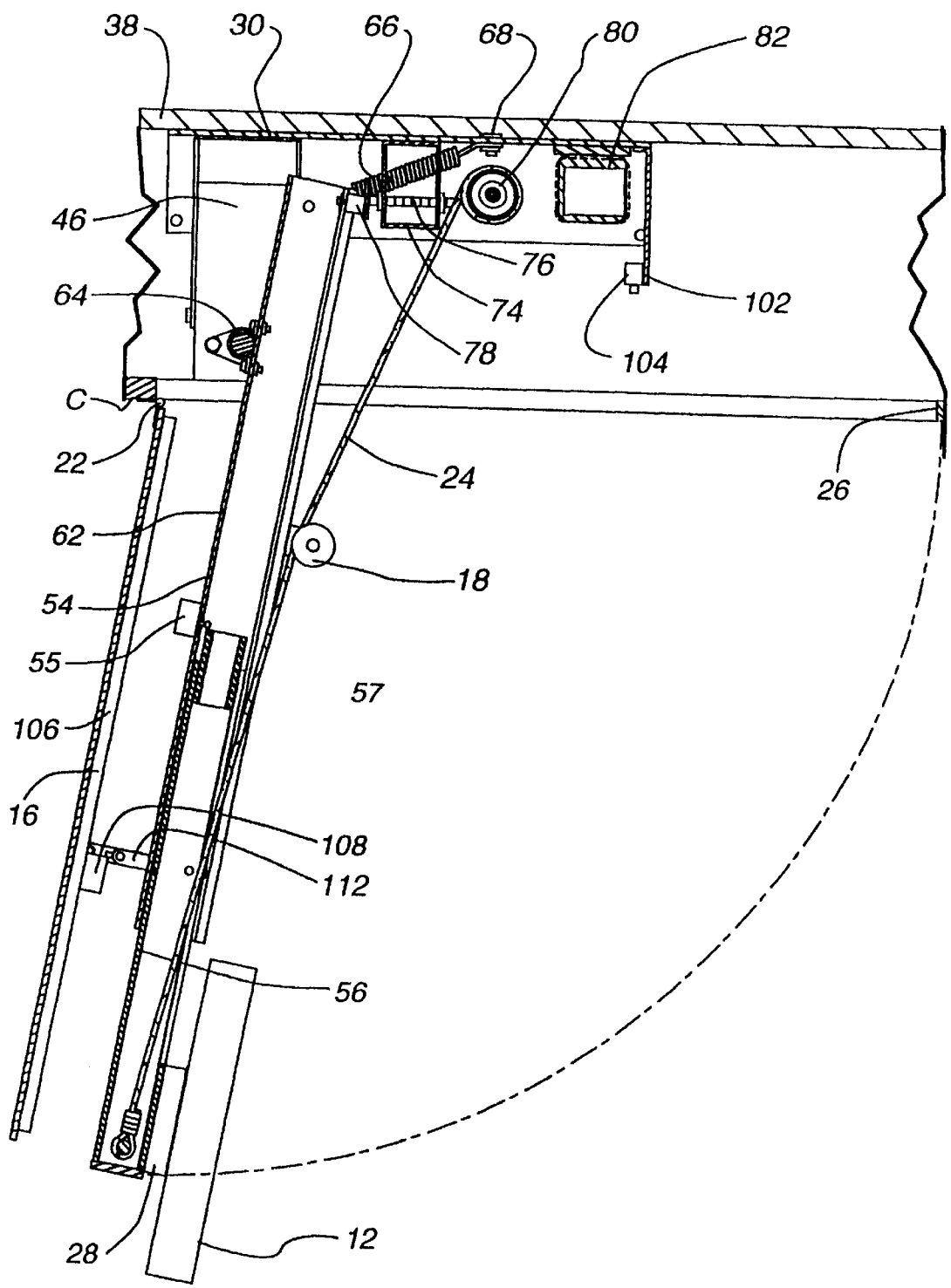
FIG. 13 is a cross-sectional view taken along lines 13—13 of FIG. 9.
Figure 14:
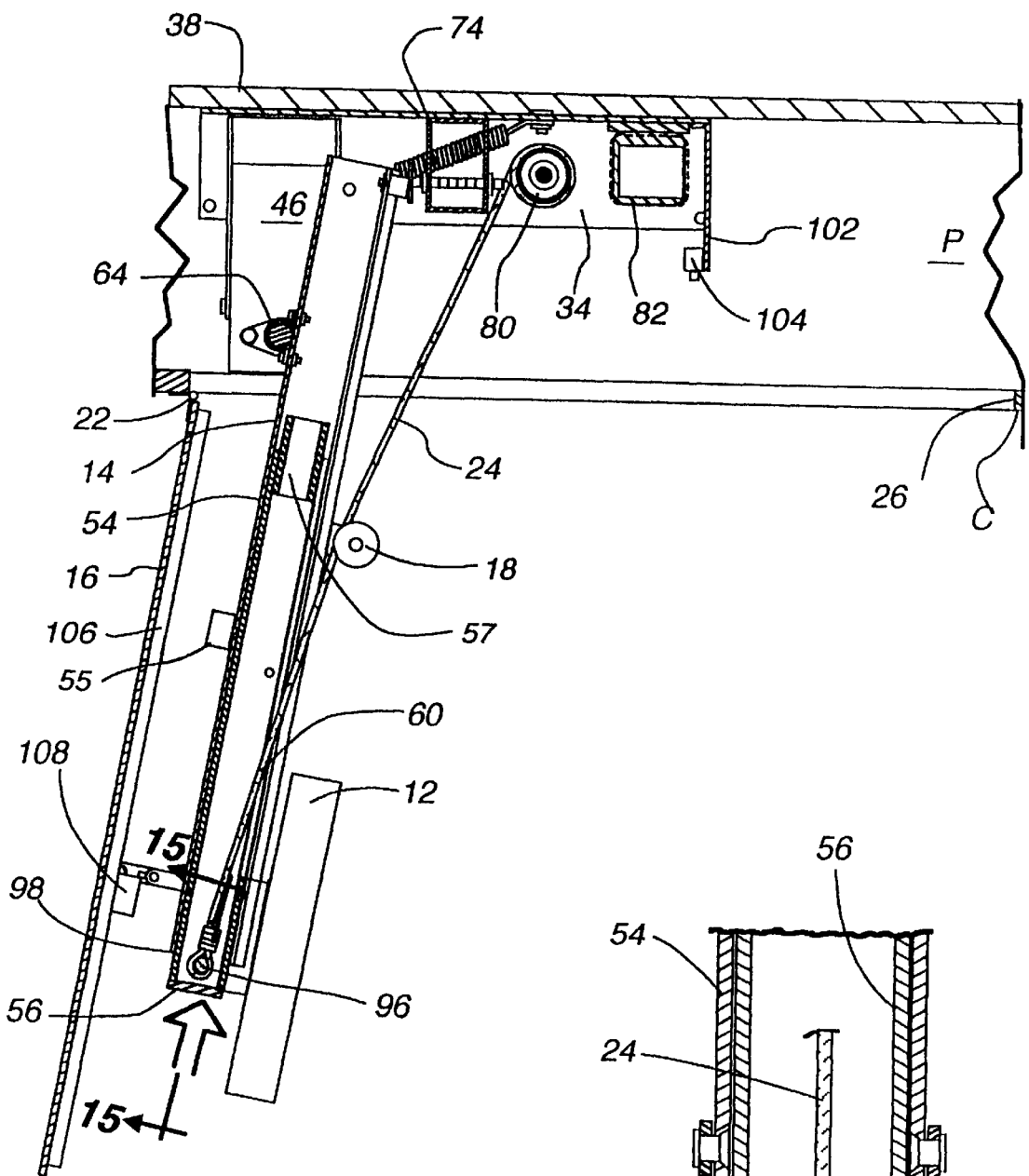
FIG. 14 is a partial side cross-sectional view of the lift mechanism according to the present invention showing the support arm being retracted as part of the pre-pivotal movement.
Figure 15:
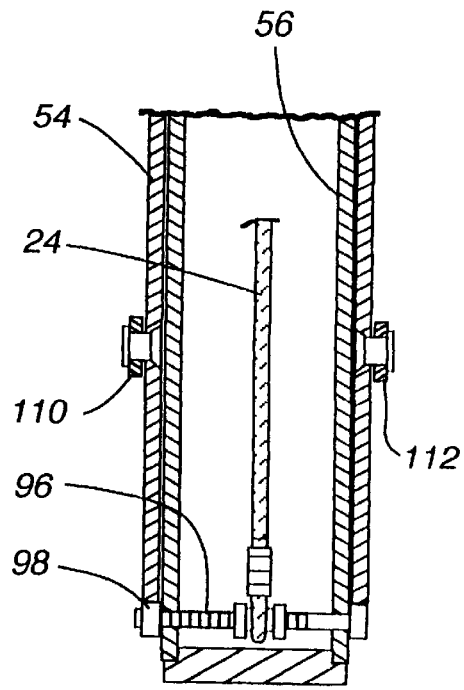
FIG. 15 is a partial cross-sectional view taken along lines 15—15 of FIG. 14.
Figure 16:
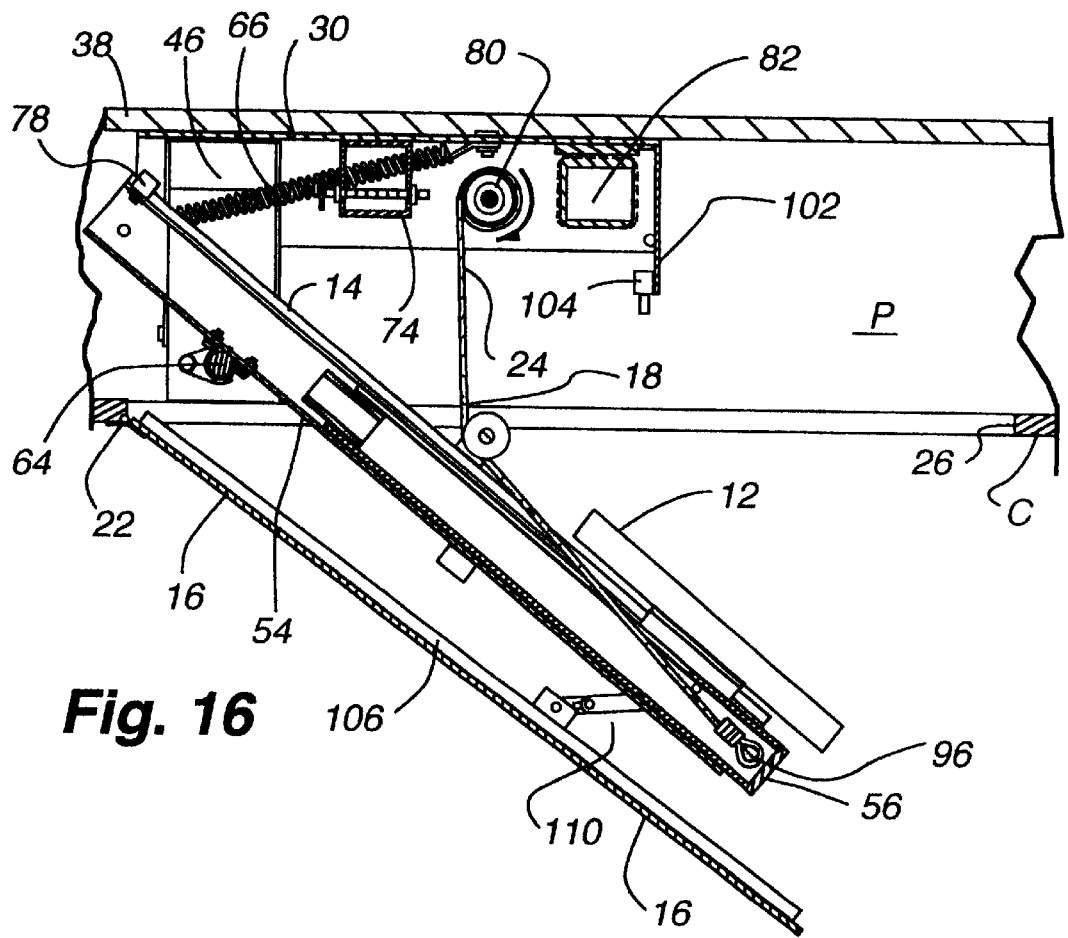
FIG. 16 is a partial cross-sectional view taken along lines 16—16 of FIG. 5.
Figure 17:
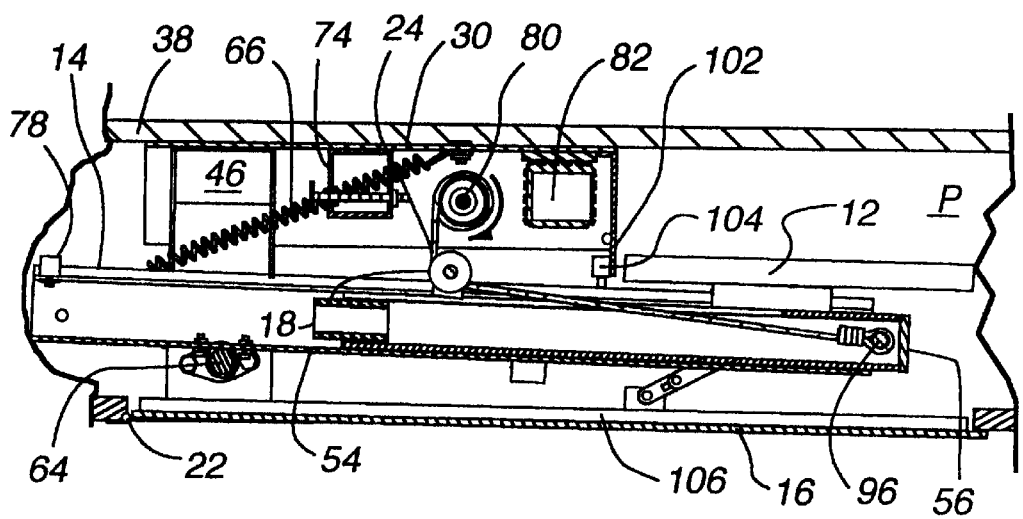
FIG. 17 is a partial cross sectional view taken along lines 17—17 of FIG. 6.

With the support arm 14 in the lowered extended position as shown in FIG. 13 the display 12 can be easily mounted on the mounting bracket 28 on the end of the lower channel 56 of the support arm 14. With the display securely mounted, the motor 82 is actuated by a control panel or a remote control suitable for this purpose. With the rotation of the motor 82 turning the drive chain 94 through the sprockets 82, 90 the cable drum 80 is rotated in the clockwise position as seen in FIG. 13 to wind and retract the cable 24. The end of the cable is suitably clamped to the anchor bolt 96 provided at the end of the lower channel 56. Upon retraction of the cable 24 the lower channel 56 is pulled upward into the interior of the upper channel 54 contracting the anchor bolt 96 and the lower channel 56 of the support arm 14 as shown in FIG. 14. Once the anchor bolt 96 or display mount 28 comes in contact with the lower end 98 of the upper channel 54 the telescoping movement is stopped. Further retraction of the cable 24 causes the upper and lower channel 54, 56 and display 12 to start pivoting towards the ceiling opening 26. The support arm 14 continues to pivotally rise with the cable 24 passing over the pulley 18 which acts as an attachment point for the upward movement. Since the ceiling cover 16 is pivoting from a different hinge 22 location, than the support shaft 48 of the support arm 14 the brackets 110, 112 start to pivot to accommodate the radial difference between the components. Further retraction of the cable 24 by the cable drum 80 causes the arm to be raised to the upper or concealed position to the point that the arm 14 and display 12 come in contact with the cutoff switch 104 which stops the motor 82 and the rotation of the cable drum 80. At this point, with proper adjustment, the ceiling cover 16 will fit within the opening 26 and align with the surface of the ceiling C to conceal the display lifting arm and actuation mechanism.

As the lifting arm 14 is raised into its upper retracted position, the biasing springs 66 are extended so as to provide a constant bias force on the lifting arm in the downward or extended position. Thus, when the support arm 14 is extended the relaxation and extension of the cable 24 allows the lower channel 56 to slidably extend from the end of the upper channel 54 to the fully extended downward position due to gravity. As previously mentioned, the stop bracket 74 and stop 76 come in contact with the resilient pad 78. It is possible to substitute an electrically operated linear actuator for the stop 74, 76 so that the final downward position of the support arm 14 can be angularly adjusted to provide the optimum viewing position of the display 12 with respect to the audience.

Materials used throughout this display lifting device can be chosen as desired to provide the desired strength characteristics and rigidity. It is to be understood that any suitable materials which provide these characteristics can be utilized. It is also understood that any display device, whether passive or active can be attached to the end of the support arm 14 for viewing purposes.

While a display lifting device for active or passive displays has been shown and described in detail, it is to be understood that this invention is not to be limited to the exact form or structure disclosed and changes in detail and construction of the invention may be made without departing from the spirit thereof.

What is claimed is:

1. A display lift device concealed within a ceiling structure of an auditorium, theatre or presentation area, said lifting device being capable of exposing a display to an audience within the area for viewing the display as desired, said display lifting device comprising:
    a) a support framework arranged to be mounted within a ceiling structure of a presentation area;
    b) a support arm having a first and second end, said support arm being elongated and pivotally mounted near the first end to the support framework;
    c) a mounting means attached to the second end of said support arm for mounting and solely supporting a display means;
    d) drive means for pivoting the support arm from a first retracted position wherein the arm and the mounted display means are positioned within the ceiling structure to a second extended position wherein the arm and display means are visible to an audience within the presentation area for viewing the display means; and
    e) said support arm is made up of a plurality of elongated telescoping channel members with the upper most channel member being pivotally mounted to said support framework and the lower most channel member includes the mounting means for solely supporting the display means.

2. The display lifting device as defined in claim 1 wherein the telescoping support arm channel members have a hollow rectangular cross-sectional configuration to prevent rotational twisting of the support arm during the movement of said display means.

3. The display lifting device as defined in claim 1 wherein the support arm is pivotally mounted a predetermined distance inwardly from the first end of said support arm and a biasing means is attached to said support arm to bias the pivotal movement of the support arm towards the extended position.

4. A display lifting device as defined in claim 3 wherein the biasing means is a spring attached to the first end of said support arm to bias the arm in the pivotally extended position.

5. The display lifting device as defined in claim 4 wherein the spring biasing means is at least one elongated coil spring attached at one end to the first end of said support arm and the opposite end to said support framework.

6. The display lifting device as defined in claim 3 wherein the pivotal movement of the support arm in the extended position is restricted by a stop means mounted in conjunction with the first end of said support arm, said stop means being adjustable to allow variable adjustment of the angular position of said support arm and said display means for proper alignment with respect to the viewing audience.

7. The display lifting device as defined in claim 6 wherein the stop means is a linear actuator which can be remotely controlled to variably adjust the angular position of the support arm and the display means for precise angular alignment of the display means with respect to the viewing audience.

8. The display lifting device as defined in claim 1 wherein said support framework includes a U shaped panel having a generally horizontal base plate and a pair of side legs positioned on opposite sides of said base plate and extending downward, generally perpendicular from said base plate.

9. The display lifting device as defined in claim 8 wherein a pair of spaced apart support columns are mounted and attached to the support framework, and a rotatable shaft is suitably mounted between said support columns, and said support arm is mounted to said rotatable shaft.

10. A display lifting device as defined in claim 9 wherein each support column, is formed from a first and second U-shaped folded plate with the open portion of the U-shaped plates facing inward towards each other forming a hollow box type column wherein the first U-shaped plate in each column can be attached to the support framework while the second facing U-shaped plate can be positionally adjusted and attached to said first plate to adjust the space and position between said columns for the mounting of said rotatable shaft for supporting and positioning said support arm.

11. The display lifting device as defined in claim 10 wherein the support arm is mounted a predetermined distance from said first end to allow said first end to act as a lever arm in the pivotal movement of the support arm from said retracted position to said extended position; and the rotatable shaft upon which the support arm is mounted is spaced from said support framework a predetermined distance which is greater than the predetermined distance of the mount from said first end of the support arm in order to provide clearance for the pivotal movement of said support arm.

12. A display lifting device as defined in claim 1 wherein the ceiling of the presentation area has an opening which is sized to accommodate the pivotal movement of the support arm and the display means, and the display lifting device further includes a cover means attached to said support arm and arranged to close the ceiling opening when the support arm and display means are in the retracted position.

13. The display lifting device as defined in claim 12 wherein one edge of the cover means is hingedly attached to an edge of the ceiling opening and the cover means pivotally moves with the support arm.

14. The display lifting device as defined in claim 1 wherein the drive means includes a cable drum drivingly connected to a reversible drive motor and having a cable wound around said drum, said support arm being hollow and one end of said cable passes through an aperture in the side of said support arm and is attached to the second end of said support arm, said drive motor being suitably connected to a control power source whereby the operation of the motor can extend or retract the cable to move the support arm and display means from said second extended position to said first retracted position.

15. The display lifting device as defined in claim 14 wherein said cable drum includes a brake means whereby if the rotational speed of the cable drum exceeds a predetermined velocity the brake means will arrest the rotational movement of the cable drum and lock it in position to prevent lowering of the support arm.

16. A display lifting device as defined in claim 14 wherein a biasing means is attached to the support arm to bias the movement of the support arm into the extended position, the aperture in said support arm means is an elongated slot positioned along one edge of the channel members facing the cable drum, and a pulley is mounted to the upper channel member near an upper end of the elongated slot whereby the cable from said cable drum passes under said pulley and down through the slot where it is attached to the lower most channel member whereby as the cable drum retracts the cable, the lower most channel member will be contracted into the upper most channel member prior to the support arm being pivoted upward from the extended position to the retracted position within the ceiling structure.

17. The display lifting device as defined in claim 16 wherein the ceiling of the presentation area has an opening which is sized to accommodate the pivotal movement of the support arm and the display means, and the display lifting device further includes a cover means attached to said support arm means and arranged to close the ceiling opening when the support arm means and display means are in the retracted position.

18. A display lift device concealed within a ceiling structure of an auditorium, theatre or presentation area, said lifting device being capable of exposing a display to an audience within the area for reviewing the display as desired, said display lifting device comprising:
    a) a support framework arranged to be mounted within a ceiling structure or a presentation area;
    b) a support arm having a first and second end, said support arm being elongated and pivotally mounted near the first end to the support framework;
    c) a mounting means attached to the second end of said support arm for mounting and supporting a display means;
    d) drive means for pivoting the support arm from a first retracted position wherein the arm and the mounted display means are positioned within the ceiling structure to a second extended position wherein the arm and display means are visible to an audience within the presentation area for viewing the display means; and
    e) said drive means includes a cable drum drivingly connected to a reversible drive motor and having a cable wound around said drum, said support arm being hollow at one end of said cable passes through an aperture in the side of said support arm and is attached to the second end of said support arm; and
    f) said drive motor being suitably connected to a control power source whereby the operation of the motor can extend or retract the cable to move the support arm and display means from said second extended position to said first retracted position.

19. A display lift device concealed within a ceiling structure of an auditorium, theatre or presentation area, said lifting device being capable of exposing a display to an audience within the area for viewing the display as desired, said display lifting device comprising:
    a) a support framework arranged to be mounted within a ceiling structure of a presentation area;
    b) a support arm having a first and second end, said support arm being elongated and pivotally mounted near the first end to the support framework;
    c) a mounting means attached to the second end of said support arm for mounting and solely supporting a display means;
    d) drive means for pivoting the support arm from a first retracted position wherein the mounted display means is positioned within the ceiling structure to a second extended position wherein the arm and display means are visible to an audience within the presentation area for viewing the display means;

e) said support arm is made up of a plurality of elongated telescoping channel members with the upper most channel member being pivotally mounted to said support framework and the lower most channel member includes the mounting means for supporting the display means; and f) said support arm channel members are hollow and a longitudinal slot is provided along one edge of said channel members and said drive means includes a lifting means mounted on said support framework with an end of the lifting means passing through said elongated slot in said support arm and being attached to the second end of the support arm whereby as the lifting means is retracted it draws the lower most channel into the upper most channel to contract the channel members and reduce the overall length of the support arm prior to being pivotally moved into the first retracted position.

20. The display lifting device as defined in claim 19 wherein a pulley is mounted to a side of the upper channel member adjacent to said slot with the lifting means passing under the pulley and into the hollow interior of the support arm, and said pulley is longitudinally positioned along the upper channel member to align the lifting means with respect to the drive means when the support arm is in the first retracted position.

21. A method for viewing a large screen display mounted within a ceiling structure in an auditorium, theater or presentation area, said method comprises the steps of:

a) mounting a support frame work above a ceiling of a presentation area and within the structure above the ceiling;

b) pivotally mounting an elongated support arm at one end so that it can pivotally move through a suitable opening in the ceiling from a first retracted position within said ceiling structure to a second extended position extending downward from said ceiling;

c) independently mounting a large screen display on an end of the support arm opposite to the pivotally mounted end so that it is solely supported by said mounting arm;

d) providing a drive mechanism to move the support arm and display between the first and second position; and e) increasing the length of the support arm when in the second position to lower the display to a location wherein the display can be easily viewed by an audience.

22. A method for viewing a large screen display as described in claim 21 wherein the movement of the support arm is controlled by a remote control device connected to the drive mechanism.

23. The method for viewing a large screen display as described in claim 21 wherein the display and support arm are enclosed within the ceiling structure when in the first position and covering the opening within the ceiling through which the arm and display pass when the arm and display are retracted.

24. The display lift device concealed within a ceiling structure of an auditorium, theatre or presentation area, said lifting device being capable of exposing a display to an audience within the area for viewing the display as desired, said display lifting device comprising:

a) a support framework arranged to be mounted within a ceiling structure of a presentation area;

b) a support arm having a first and second end, said support arm being elongated and pivotally mounted near the first end to the support framework;

c) a mounting means attached to the second end of said support arm for mounting and solely supporting a display means;

d) a drive means for pivoting the support arm from a first retracted position wherein the arm and the mounted display means are positioned within the ceiling structure to a second extended position wherein the arm and display means are visible to an audience within the presentation area for viewing the display means; and e) said support arm is pivotally mounted a predetermined distance inwardly from the first end of said support arm and a biasing means is attached to said support arm to bias the pivotal movement of the support arm towards the extended position.

25. The lifting device as defined in claim 24 wherein the biasing means is a spring attached to the first end of said support arm to bias the arm in the pivotally extended position.

26. The display lifting device as defined in claim 25 wherein the spring biasing means is at least one elongated coiled spring attached at one end to the first end of said support arm and the opposite end to said support framework.

27. The display lifting device as defined in claim 24 wherein the pivotal movement of the support arm in the extended position is restricted by a stop means mounted in conjunction with the first end of said support arm, said stop means being adjustable to allow variable adjustment of the angular position of said support arm and said display means for proper alignment with respect to the viewing audience.

28. The display lifting device as defined in claim 27 wherein the stop means is a linear actuator which can be remotely controlled to variably adjust the angular position of the support arm and the display means for precise angular alignment of the display means with respect to the viewing audience.

29. A display lift device concealed within a ceiling structure of an auditorium, theatre or presentation area, said lifting device being capable of exposing a display to an audience within the area for viewing the display as desired, said display lifting device comprising:

a) a support framework arranged to be mounted within a ceiling structure of a presentation area;

b) a support arm having a first and second end, said support arm being elongated and pivotally mounted near the first end to the support framework;

c) a mounting means attached to the second end of said support arm for mounting and supporting a display means;

d) drive means for pivoting the support arm from a first retracted position wherein the arm and the mounted display means ARE positioned within the ceiling structure to a second extended position wherein the arm and display means are visible to an audience within the presentation area for viewing the display means; and e) wherein the ceiling of the presentation area has an opening which is sized to accommodate the pivotal movement of the support arm and the display means, and the display lifting device further includes a cover means attached to said support arm and arranged to close the ceiling opening when the support arm and the display means are in the retracted position.

30. The display lifting device as defined in claim 29 wherein one edge of the cover means is hingedly attached to an edge of the ceiling opening and cover means pivotally moves with the support arm.

* * * * *